United States Patent Office 3,457,194
Patented July 22, 1969

3,457,194
**1-CYANOBICYCLO[1.1.0]BUTANE AND
ITS POLYMERS**
Henry K. Hall, Jr., Wilmington, Del., assignor to E. I. du
Pont de Nemours and Company, Wilmington, Del., a
corporation of Delaware
No Drawing. Filed Mar. 16, 1966, Ser. No. 534,673
Int. Cl. C08g 33/00
U.S. Cl. 260—2        9 Claims

ABSTRACT OF THE DISCLOSURE

Described and claimed are (1) Monomers of the formula

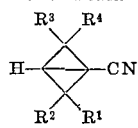

wherein $R^1$, $R^2$, $R^3$ and $R^4$, which may be alike or different, are hydrogen or hydrocarbyl of 1 through 18 carbon atoms free of aliphatic carbon-to-carbon unsaturation;

(2) Polymers prepared from the foregoing monomers characterized by the recurring catenarian structural units of the formula

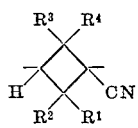

wherein all symbols have the previously stated significance; and (3) Processes for preparing both the foregoing monomers and polymers.

The monomers of this invention are useful in the preparation of the polymers of this invention which in turn find a variety of applications as tough, nonbrittle, self-supporting films or fibers.

FIELD OF THE INVENTION

This invention relates to polymeric materials, to monomers used to prepare them, and to processes for preparing both. More particularly, the invention concerns 1-cyanobicyclo[1.1.0]butane monomers, polymers prepared therefrom, and processes for preparing both.

SUMMARY AND DETAILS OF THE INVENTION

The novel monomers of this invention can be represented by the formula

I

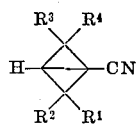

wherein $R^1$, $R^2$, $R^3$ and $R^4$ may be alike or different and are selected from hydrogen or hydrocarbyl of 1 through 18 carbon atoms which is free of aliphatic carbon-to-carbon unsaturation. By the term "free of aliphatic carbon-to-carbon unsaturation" is meant that the hydrocarbyl group cannot contain any double or triple bonds other than those found in an aromatic ring system. Thus, the term "hydrocarbyl" set forth above includes such groups as alkyl, cycloalkyl, aryl, alkaryl, or aralkyl and the like.

The novel polymers of this invention prepared from the above-identified monomers are characterized by the recurring catenarian structural units of the formula

II

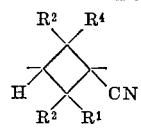

wherein $R^1$, $R^2$, $R^3$ and $R^4$ are defined as above. The polymers are homopolymers prepared from the monomers of Formula I.

The term "hydrocarbyl" as used throughout the present specification and claims is synonomous with the term "hydrocarbon radical," i.e., an organic radical consisting only of carbon and hydrogen atoms. Examples of $R^1$, $R^2$, $R^3$ and $R^4$, in addition to hydrogen, include alkyl, cycloalkyl, aryl, alkaryl or aralkyl. The only prerequisites for the aforesaid hydrocarbyl groups are that the groups must be free of aliphatic carbon-to-carbon unsaturation and must contain 1–18 carbon atoms. Preferred herein are hydrocarbyl groups containing 1–12 carbon atoms, and particularly those containing 1–6 carbon atoms. Illustrative hydrocarbyl groups as defined hereinabove include alkyl groups, such as methyl, ethyl, t-butyl, hexyl, isooctyl, dodecyl, octadecyl and the like; cycloalkyl groups such as cyclopropyl, cyclobutyl, cyclopentyl, cyclohexyl, cyclooctyl, methylcyclohexyl, 3,5-dicyclohexylcyclohexyl, cyclooctadecyl and the like; aryl groups such as phenyl, naphthyl, anthryl, p-phenylphenyl, p-biphenylphenyl, naphthacenyl, benzanthryl, chrysenyl and the like; alkaryl groups such as p-tolyl, p-cumenyl, 2,4,6-tributylphenyl, 9,10-diethyl-1-anthryl, 6-methyl-2-naphthyl, and the like; and aralkyl groups such as benzyl, phenylethyl, diphenylmethyl, α-naphthylethyl, 2-(2-anthryl)ethyl, 4-(2-anthryl) butyl and the like.

The 1-cyanobicyclo[1.1.0]butanes of Formula I are prepared by first reducing a 3-cyanocyclobutanone of the formula

III

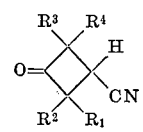

wherein $R^1$–$R^4$ are defined as above. For example, the 3-cyanocyclobutanone can be reduced with hydrogen and a hydrogenation catalyst or with sodium borohydride in water to obtain the corresponding 1-cyano-3-hydroxycyclobutane which is represented by the structural formula

IV

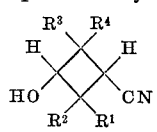

The starting material of Formula III can be prepared as described in Cripps et al., J. Am. Soc. 81, 2723–8 (1959).

By known chemical procedures the hydroxy group is then replaced with a conventional leaving group to obtain the corresponding 1-cyano-3-substituted cyclobutanes of the structural formula

V

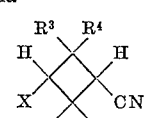

wherein X can be chloro, iodo, bromo, benzenesulfonyl, parabromobenzenesulfonyl, paratolylsulfonyl, or trimethylamino. For example, the hydroxy compound of Formula IV can be treated with thionyl chloride in the presence of pyridine to obtain the corresponding 1-cyano-3-chlorocyclobutane.

To obtain the monomers of this invention, the 1-cyano-3-substituted cyclobutanes of Formula V are treated with a strong base, such as sodium hydroxide, potassium hydroxide, tetramethyl ammonium hydroxide, potassium tertiary butoxide, and the like, to obtain the corresponding 1-cyano-bicyclo[1.1.0]butane of Formula I. This reaction is ordinarily carried out in the presence of an inert solvent, for example, ethers such as tetrahydrofuran, diethyl ether, dioxane, dibutyl ether, and the like. Pressure is not critical and super- or subatmospheric pressure can be employed. Preferably, the reaction is carried out in the presence of an inert atmosphere such as nitrogen, helium, or the like. Temperature is not critical, but in general it is preferred to carry out the reaction in a temperature range of −20°−+10° C. Reaction times are not critical; nor are reactant ratios. However, preferably a 1:1 molar ratio of base to the substituted cyclobutane is employed. The monomer is isolated by conventional procedures such as separation of organic and aqueuos layers and distillation.

In general, the monomers of this invention are colorless liquids and are used to prepare the polymers of this invention.

The homopolymers of this invention are prepared by the addition polymerization of the monomer of Formula I, in bulk, in dispersion, in emulsion, or in solution in an inert organic solvent at a temperature of −100° to 160° C. in the presence of a free radical-generating initiator. Pressures above and below atmospheric pressure are operable. Atmospheric and superatmospheric pressures are preferred.

Suitable solvents and/or dispersion media for the free-radical polymerization include water, hydrocarbons such as benzene and hexane, chlorinated aromatic hydrocarbons such as chlorobenzene, nitriles such as acetonitrile, amides such as dimethylformamide and N-methylpyrrolidone, sulfoxides such as tetramethylenesulfoxide, and the like. As indicated above, it is not essential that a solvent or dispersion medium be used, and bulk polymerizations can be carried out.

The free radical-generating initiators may be selected from a wide variety of compounds representative of this type of initiator. Included are the azo initiators, for example, α,α′-azodiisobutyronitrile, 1,1′-azodicyclohexanecarbonitrile, dimethyl α,α′-azodiisobutyrate and α,α′-azodiisobutyramide, and the organic peroxides and hydroperoxides, for example, dibenzoyl peroxide, di-t-butyl peroxide, and t-butyl hydroperoxide. The initiators can be used in proportions ranging from 0.01 to 10 weight percent of the monomer being polymerized. Other sources of free radicals for initiating polymerization may also be used such as electron bombardment, ultraviolet light in the presence of a sensitizer, and the like.

Reaction times for preparing polymers from a bicyclobutane can vary from a few seconds (i.e., 5) to several days, for example, two to three days or more depending on the particular monomer, initiator, solvent, and reaction temperature employed.

The resulting polymer, as will be evident from Formula II, will contain the indicated structural units arranged in more than one spacial configuration, i.e., the cyano group may be positioned cis or trans and thus the polymer may be isotactic, syndiotactic, and the like. All of these polymeric configurations are included within the scope of this invention.

EMBODIMENTS OF THE INVENTION

The following examples illustrate the invention in further detail but are not meant to limit the invention in any respect:

EXAMPLE 1

Part A 3-hydroxycyclobutanecarbonitrile: To a stirred solution of 2.25 g. (0.060 mole) of sodium borohydride in 50 ml. of water was added with stirring a warm slurry of 19.0 g. (0.20 mole) of 3-cyanocyclobutanone in 50 ml. of water. The reaction was mildly exothermic and ice cooling was used to maintain the temperature at 35°. After the addition was complete, the solution was stirred at room temperature for 4 hrs. and was extracted continuously overnight with chloroform. The chloroform extract was dried and distilled to give 16.79 g. (86.5%) of 3-hydroxycyclobutanecarbonitrile in the form of a colorless liquid, B.P. 70–71° (0.33 mm.). Gas chromatography showed the compound to be a 70:30 cis-trans mixture.

Analysis.—Calcd. for $C_5H_7ON$: C, 61.84; H, 7.27; N, 14.42. Found: C, 61.52; H, 7.26; N, 14.18.

This compound can also be prepared by catalytic hydrogenation in tetrahydrofuran solution using platinum on carbon as catalyst.

Part B 3-chlorocyclobutanecarbonitrile: To a stirred solution of 14.03 g. (0.145 mole) of 3-hydroxycyclobutanecarbonitrile, 12.0 g. (0.152 mole) of dry pyridine and 25 ml. of chloroform was added at 0–5° a solution of 19.80 g. (0.166 mole) of thionyl chloride in 25 ml. of chloroform during 38 minutes. The solution was allowed to warm to room temperature with stirring. With continued stirring during 2 hrs., the temperature was raised to 56° and during an additional 2 hrs. to 65°. The solution was cooled and washed with 500 ml. of water containing 10 ml. of 37% of hydrochloric acid, with 500 ml. of water containing 10 g. of sodium hydroxide, and with 500 ml. of water containing 10 g. of potassium chloride. It was dried with magnesium sulfate and distilled in a small spinning-band column to give 13.69 g. (81.7%) of 3-chlorocyclobutanecarbonitrile, B.P. 98° (28 mm.). Gas chromatography showed this compound to be a 83:17 cis-trans mixture.

Analysis.—Calcd. for $C_5H_6NCl$: C, 51.96; H, 5.23; Cl, 30.68. Found: C, 52.04; H, 5.59; Cl. 30.70.

Part C 1-cyanobicyclo[1.1.0.]butane: To a stirred solution of 4.50 g. (0.0401 mole) of potassium t-butoxide in 30 ml. of purified tetrahydrofuran was added at 3° during 24 min. a solution of 3.90 g. (0.0338 mole) of 3-chlorocyclobutanecarbonitrile in 5 ml. of tetrahydrofuran. A nitrogen atmosphere was maintained during the addition. The thick, white slurry was stirred at 0° for an additional 83 min., at which time 75 ml. of a saturated aqueous solution of potassium chloride was added. The tetrahydrofuran layer was separated and washed twice with 25-ml. portions of potassium chloride solution. The aqueous layers were backwashed with 25 ml. of tetrahydrofuran. The organic layers were dried with magnesium sulfate and distilled in a small Vigreux column. A little 2,5-di-t-butylquinone was added to suppress possible radical polymerization. 1-cyanobicyclo[1.1.0]butane, 1.73 g. (65%), was obtained as a colorless liquid, B.P. 58° (26 mm.). The n.m.r. spectrum confirmed the assigned structure.

Part D

Poly-1-cyano-1,3-cyclobutane: 1-cyanobicyclobutane in a closed container at room temperature polymerized completely during 6 days to a tough, white solid. This dissolved completely in warm dimethyl formamide to give a clear solution from which the polymer was recovered in fibrous form by precipitation into methanol. The polymer, dried at 120°, possessed an inherent viscosity in dimethyl formamide of 3.00, indicative of very high molecular weight. On a heated bar, it did not darken or melt at 325°.

EXAMPLE 2

Part A 1-cyano-bicyclo[1.1.0]butane: A 1-l. glass flask with a stirrer, condenser and nitrogen bleed was dried with a heat gun and cooled under nitrogen. Under a nitrogen atmosphere there was placed in the flask 62.4 g. of 3-chlorocyclobutanecarbonitrile and 600 ml. of ether. The mixture was stirred and cooled to 12° C., at which temperature 66.0 g. of potassium t-butoxide was added portionwise over a period of eight minutes. Stirring at 12° C. was continued for 15 minutes. About 20 g. of powdered solid carbon dioxide and about 10 grams of magnesium sulfate were then added, followed by 0.40 g. of 2,5-di-t-butylquinone and 0.40 g. of di-t-butylhydroquinone. The reaction mixture was filtered cold through diatomaceous earth under nitrogen, followed by a rinse of fresh ether. Ether was evaporated from the filtrate under water vacuum at 35–45° C. The residue along with 0.2 g. each of 2,5-di-t-butylquinone and di-t-butylhydroquinone was transferred to a distillation flask and distilled at 8 mm. using a heating bath. Volatile materials were removed with the bath at 25° C. With the bath at 55° C., there was distilled about 35 g. of 1-cyanobicyclo[1.1.0]butane of high purity. It was stored at −78° C. The n.m.r. spectrum either neat or in deuterochloroform was in agreement with the assigned structure. No olefinic unsaturation or tetrahydrofuran was detectable. The infrared spectrum of this sample supported the assigned structure and showed no hydroxyl or olefinic unsaturation.

*Analysis.*—Calcd. for $C_5H_5N$: C, 75.92; H, 6.37; N, 17.71. Found: C, 76.14; H, 6.64; N, 17.41, 17.49.

Part B

Poly-1-cyano-1,3-cyclobutane: To a stirred mixture of 15.8 g. of 1-cyanobicyclo[1.1.0]butane in 100 ml. of degassed distilled water, blanketed under nitrogen, were added a solution of 0.100 g. of potassium persulfate in 3 ml. of water and a solution of 0.0344 g. of sodium bisulfite in 1 ml. of water. Polymerization was noted by opalescence and curds began to form immediately. It was mildly exothermic, max. temp. 42°. Reaction proceeded through a soft mush, a soft sheet on the walls, a solid sheet, and a thick white slurry. Total time was 9 hrs. The slurry was filtered and washed with water. It was run through a blender with 400 ml. of water, filtered, and washed. This was repeated with water and then with methanol. Drying under nitrogen in a vacuum oven at 80° gave 15.4 g. (98%) of white polymer, M.P. >350°, no decomposition, $\eta_{inh}$ (N-methylpyrrolidone) 2.63, at room temperature.

EXAMPLE 3

Poly - 1 - cyano - 1,3 - cyclobutane: To a mixture of 10.4 g. of 1-cyanobicyclo[1.1.0]butane, 80 ml. of degassed distilled water, and 1.2 g. of the sodium salt of lauryl alcohol sulfate under nitrogen was added with stirring 0.100 g. of potassium persulfate in 3 ml. of water and 0.0344 g. of sodium bisulfite in 1 ml. of water. Polymerization proceeded smoothly and mildly exothermically to form a creamy emulsion. Stirring was continued for 19 hrs. The emulsion was added to 300 ml. of saturated aqueous potassium chloride to form an extremely fine precipitate. This filtered slowly. The cake was broken up in a blender with 400 ml. of saturated potassium chloride solution and filtered. This was repeated. The product was blended three times with water, and dried in a vacuum oven at 80° under nitrogen to give 10.6 g. of polymer, $\eta_{inh}$ in dimethylformamide was 3.25 at room temperature.

EXAMPLE 4

Poly-1-cyano - 1,3 - cyclobutane: Distilled 1 - cyanobicyclo[1.1.0]butane was dissolved in twice its volume of N-methylpyrrolidone and left at room temperature. It polymerized to an extremely viscous solution.

EXAMPLE 5

Poly-1-cyano-1,3-cyclobutane: A solution of 3.1 g. of 1-cyanobicyclo[1.1.0]butane in 8.0 ml. of distilled dimethylsulfoxide was treated with 0.1 ml. of an 0.2 M solution of azobisisobutyronitrile in dimethylsulfoxide at 55° for 16 hrs. A rigid glass formed.

EXAMPLE 6

Poly-1-cyano-1,3-cyclobutane: The procedure of Example 5 was employed except that 1.2 g. of monomer in 20 ml. of tetramethylenesulfoxide were used. A film was cast from the resulting reaction mixture and dried in a vacuum oven at 80° C.

EXAMPLE 7

Poly-1-cyano-1,3-cyclobutane: The procedure of Example 5 was employed except that 3.4 g. of monomer in 20 ml. of tetramethylenesulfoxide were used. This produced a clear viscous dope. Films were cast directly and dried at 80° in a vacuum oven with nitrogen bleed. Tough, orientable, clear films were obtained. A sample of the polymer was isolated by precipitation of 7.0 g. of solution into methanol. After two blender washings, the dried polymer weighed 0.6 g. and had an inherent viscosity of 1.83 in N-methylpyrrolidone containing 5% LiCl at 100° C.

EXAMPLE 8

Poly-1-cyano-1,3-cyclobutane: A solution of 12.8 g. of 1 - cyanobicyclobutane and 0.05 g. of azobisisobutyronitrile in 100 ml. of pure hexane was stirred at 75° under reflux and nitrogen. Granular particles formed rapidly after 16 hrs., the reaction mixture was a thick granular mass. It was cooled and filtered. It was blended twice with water and once with methanol, 400 ml. each, and filtered very rapidly. The white polymer weighed 8.6 g. after drying.

EXAMPLE 9

Films from direct polymerization dopes: A clear thick dope, prepared by direct polymerization of 1-cyanobicyclobutane in tetramethylenesulfoxide, as in Example 6, was cast onto glass plates using a 0.01″ or 0.02″ doctor knife. The plates were placed in an 80° oven and subjected to full pump vacuum with a slight nitrogen bleed for 4 hrs. The films were sparkling clear, tough, and creasable.

EXAMPLE 10

Films from isolated polymers: A 5% solution of polymer, from Example 2, Part B, in N-methylpyrrolidone was prepared using an air-driven double-disc stirrer and warming to 65°. A trace of gel was removed. The dope was cast as in Example 10 to obtain clear tough films.

EXAMPLE 11

Direct preparation of shaped objects: A n.m.r. tube was filled with freshly distilled 1-cyanobicyclobutane. After 6 days at room temperature it had completely solidified to a translucent rod. The glass tube was broken open and removed leaving a tough flexible rod of polymer.

When the 1-cyano-3-alkylenecyclobutanes shown in column 1 of Table I are subjected to ozonolysis in the procedure of Cripps et al., J. Am. Chem. Soc. 81, 2723–8 (1959),the substituted 3-cyanocyclobutanones of column 2 are obtained. When these in turn are substituted for 3-cyanocyclobutanone in the procedure of Example 1 above the 1-cyanobicyclo[1.1.0]butanes of column 3 are obtained. These yield the corresponding polymers when treated according to the procedure of Example 2, Part B.

TABLE I

| Item | (1) 1-cyano-3-alkyl-enecyclobutane | (2) 3-cyanocyclobutanone | (3) 1-cyanobicyclo-[1.1.0]butane |
|---|---|---|---|
| 1 | 1-cyano-2,2-diethyl-3-methylenecyclobutane. | 3-cyano-2,2-diethyl-cyclobutanone. | 1-cyano-2,2-diethyl-bicyclo[1.1.0]-butane. |
| 2 | 1-cyano-2,2-di(n-butyl)-4-methyl-3-methylenecyclobutane. | 3-cyano-2,2-di(n-butyl)-4-methyl cyclobutanone. | 1-cyano-2,2-di(n-butyl)-4-methyl-bicyclo[1.1.0]-butane. |
| 3 | 1-cyano-2-dodecyl-3-methylene-4-phenylcyclobutane. | 3-cyano-2-dodecyl-4-phenylcyclobutanone. | 1-cyano-2-dodecyl-4-phenylbicyclo-[1.1.0]butane. |
| 4 | 2-n-butyl-1-cyano-3-(9-heptadecylidene)-2-methylcyclobutane. | 2-n-butyl-3-cyano-2-methylcyclobutanone. | 2-n-butyl-1-cyano-2-methylbicyclo-[1.1.0]butane. |
| 5 | 1-cyano-4-decyl-3-isopropylidene-2,2-dimethyl-cyclobutane. | 3-cyano-4-decyl-2,2-dimethylcyclobutanone. | 1-cyano-4-decyl-2,2-dimethylbicyclo-[1.1.0]butane. |
| 6 | 1-cyano-4-cyclohexyl-2-cyclopropyl-2-methyl-3-methylenecyclobutane. | 3-cyano-4-cyclohexyl-2-cyclopropyl-2-methylcyclobutanone. | 1-cyano-4-cyclohexyl-2-cyclopropyl-2-methyl-bicyclo[1.1.0]-butane. |
| 7 | 2-benzyl-1-cyano-2-methyl-3-methylene-4-tridecyl-cyclobutane. | 2-benzyl-3-cyano-2-methyl-4-tridecyl-cyclobutanone. | 2-benzyl-1-cyano-2-methyl-4-tridecyl-bicyclo[1.1.0]-butane. |
| 8 | 1-cyano-3-methylene-2,2-diphenyl-cyclobutane. | 3-cyano-2,2-diphenylcyclobutanone. | 1-cyano-2,2-diphenylbicyclo-[1.1.0]butane. |
| 9 | 1-cyano-3-methylene-2-(β-naphthyl)cyclobutane. | 3-cyano-2-(β-naphthyl)cyclobutanone. | 1-cyano-2-(β-naphthyl)bicyclo-[1.1.0]butane. |
| 10 | 1-cyano-2-(α-naphthyl)-2-phenyl-3-(1-phenyl-1-p-tolyl)methylenecyclobutane. | 3-cyano-2-(α-naphthyl)-2-phenyl-cyclobutanone. | 1-cyano-2-(α-naphthyl)-2-phenyl-bicyclo[1.1.0]-butane. |
| 11 | 1-cyano-2-cyclohexylmethyl-3-methylenecyclobutane. | 3-cyano-2-cyclohexylmethyl-cyclobutanone. | 1-cyano-2-cyclohexylmethyl-bicyclo[1.1.0]-butane. |

For convenience and because of availability, $R^1$, $R^2$, $R^3$ and $R^4$ will be hydrogen, lower alkyl or phenyl. Most preferably, $R^1$ through $R^4$ will be hydrogen.

The polymers of this invention are of extremely high molecular weight having inherent viscosities of 1.2 or more. The infrared spectrum of the polymer from Example 1–D recorded CN groups at 4.47µ (m.), and CH groups at 3.35 (m.) and 3.39µ (m.). The homopolymers of the invention are high melting, tough, nonbrittle and form self-supporting films or fibers. The polymers can be drawn to form oriented fibers of high tensile strength. For example, a polymer prepared as in Example 5 was drawn from dimethylsulfoxide at about 125° C. to form a fiber. The polymers can be easily cast into films, shaped objects, or drawn into fibers from conventional solvents such as dimethylformamide, N-methylpyrrolidone, tetramethylenesulfoxide, and the like. Thus, the polymers of the invention are useful in a wide variety of applications as coating compositions, self-supporting films, and fibers, especially those applications wherein strong, nonbrittle films or fibers are desired. For example, the direct preparation of spin dopes is accomplished by polymerization of the monomer in tetramethylenesulfoxide or N-methylpyrrolidone solution.

The foregoing detailed description has been given for clearness of understanding only and no unnecessary limitations are to be understood therefrom. The invention is not limited to the exact details shown and described, for obvious modifications will occur to those skilled in the art.

The embodiments of the invention in which an exclusive property or privilege is claimed are defined as follows:

I claim:

1. A polymer represented by the recurring structural unit

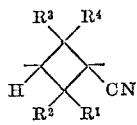

wherein $R^1$, $R^2$, $R^3$ and $R^4$ may be alike or different and are selected from hydrogen or hydrocarbyl of 1 through 18 carbon atoms which is free of aliphatic carbon-to-carbon unsaturation.

2. The polymer of claim 1 wherein $R^1$, $R^2$, $R^3$ and $R^4$ may be alike or different and are selected from hydrogen, lower alkyl, or phenyl.

3. The polymer of claim 1 wherein $R^1$, $R^2$, $R^3$ and $R^4$ are each hydrogen.

4. The polymer of claim 1 wherein said polymer has an inherent viscosity of at least 1.2.

5. The polymer of claim 2 wherein said polymer has an inherent viscosity of at least 1.2.

6. The polymer of claim 3 wherein said polymer has an inherent viscosity of at least 1.2.

7. The polymer of claim 1 in the form of a fiber.

8. The polymer of claim 1 in the form of a film.

9. The polymer of claim 1 in the form of a shaped article.

References Cited

FOREIGN PATENTS

| 684,643 | 1/1967 | Belgium. |
| 1,080,949 | 10/1967 | Great Britain. |
| 6,610,673 | 1/1967 | Netherlands. |

OTHER REFERENCES

Wiberg, K. B., et al.: Jacs, 81, 5261 (1959).

JOSEPH L. SCHOFER, Primary Examiner

C. A. HENDERSON, JR., Assistant Examiner

U.S. Cl. X.R.

260—80, 88.7, 464